(12) United States Patent
Giovannini et al.

(10) Patent No.: US 7,011,115 B1
(45) Date of Patent: Mar. 14, 2006

(54) INSULATED PIPE STRUCTURE AND METHODS OF MAKING SUCH STRUCTURES

(75) Inventors: Umberto Giovannini, Buccinasco (IT); Giuseppe Stani, Borgo San Giovanni (IT)

(73) Assignee: Saipem, S.p.A., Milan (IT)

( * ) Notice: Subject to any disclaimer, the term of this patent is extended or adjusted under 35 U.S.C. 154(b) by 0 days.

(21) Appl. No.: 09/959,624

(22) PCT Filed: May 26, 2000

(86) PCT No.: PCT/EP00/05229

§ 371 (c)(1), (2), (4) Date: Jan. 24, 2002

(87) PCT Pub. No.: WO00/73696

PCT Pub. Date: Dec. 7, 2000

(30) Foreign Application Priority Data

May 27, 1999 (GB) .................................. 9912451

(51) Int. Cl.
*F16L 9/14* (2006.01)
(52) U.S. Cl. .................. 138/149; 138/112; 138/155
(58) Field of Classification Search ............... 138/112, 138/114, 149, 155
See application file for complete search history.

(56) References Cited

U.S. PATENT DOCUMENTS

| | | | | |
|---|---|---|---|---|
| 3,307,590 A | * | 3/1967 | Carlson ..................... 138/149 |
| 3,453,716 A | * | 7/1969 | Cook ........................ 29/421.1 |
| 3,480,493 A | * | 11/1969 | Bauer et al. .................. 156/78 |
| 3,563,572 A | | 2/1971 | French |
| 3,677,303 A | | 7/1972 | Martin |
| 3,731,710 A | * | 5/1973 | Bauer et al. ................. 138/143 |
| 3,865,145 A | * | 2/1975 | McKay et al. .............. 138/113 |
| 4,025,091 A | * | 5/1977 | Zeile, Jr. ..................... 285/53 |
| 4,162,093 A | * | 7/1979 | Sigmund ..................... 285/47 |
| 4,287,245 A | * | 9/1981 | Kikuchi ..................... 428/34.2 |
| 4,590,971 A | * | 5/1986 | Webster et al. ............. 138/149 |
| 4,640,312 A | | 2/1987 | Patell et al. |
| 4,657,050 A | * | 4/1987 | Patterson ................... 138/149 |
| 4,660,861 A | * | 4/1987 | Argy et al. .................. 285/45 |
| 4,874,648 A | * | 10/1989 | Hill et al. .................. 428/35.9 |
| 4,921,018 A | | 5/1990 | Dridi et al. |
| 5,722,462 A | * | 3/1998 | Dridi et al. ................. 138/149 |
| 5,871,034 A | | 2/1999 | Sumner |

(Continued)

FOREIGN PATENT DOCUMENTS

DE  1 650 049  4/1970

(Continued)

OTHER PUBLICATIONS

US 6,513,577, 02/2003, Baylot et al. (withdrawn)*

*Primary Examiner*—James Hook
(74) *Attorney, Agent, or Firm*—Buchanan Ingersoll PC

(57) ABSTRACT

An insulated pipe structure suitable for use in an undersea pipeline comprises, intermediate its ends, an inner pipe (11) for serving as a conduit for fluid flowing through the pipe structure, thermally insulating material (3) extending around the inner pipe and an outer shell (2) extending around the insulating material (3). At each of the ends of the pipe structure the inner pipe is connected to the outer shell by a thermally insulating connecting element (4) which is secured to the inner pipe (11) at least partly by virtue of adhesive forces between the inner pipe (11) and the connecting element (4). The thermally insulating connecting element (4) and the outer shell (2) together protect the insulating material (3) from water ingress and from ambient pressure.

35 Claims, 2 Drawing Sheets

U.S. PATENT DOCUMENTS

| | | | |
|---|---|---|---|
| 6,196,272 B1 * | 3/2001 | Davis et al. | 138/149 |
| 6,213,157 B1 * | 4/2001 | Thiebaud et al. | 138/149 |
| 6,305,429 B1 * | 10/2001 | Welch et al. | 138/149 |
| 2003/0075226 A1 * | 4/2003 | Codling et al. | 138/113 |

FOREIGN PATENT DOCUMENTS

| | | |
|---|---|---|
| EP | 0 162 760 B1 | 11/1985 |
| EP | 0 244 440 B1 | 11/1987 |
| EP | 0 400 689 B1 | 12/1990 |
| EP | 0 445 902 A1 | 9/1991 |
| EP | 0342661 B1 | 8/1992 |
| EP | 0 634 602 B1 | 1/1995 |
| EP | 0 782 680 B1 | 7/1997 |
| FR | 1184877 | 7/1959 |
| FR | 2 586 466 | 2/1987 |
| GB | 1 306 832 | 2/1973 |
| GB | 1 419 810 | 12/1975 |
| GB | 1 483 143 | 3/1976 |
| GB | 2 027 158 A | 2/1980 |
| GB | 2 138 916 A | 10/1984 |
| GB | 2 161 565 A | 1/1986 |
| GB | 2 191 842 A | 12/1987 |
| GB | 2 263 752 A | 8/1993 |
| GB | 2 322 423 A | 8/1998 |
| GB | 2 322 423 B | 8/1998 |
| GB | 3 325 507 A | 11/1998 |
| GB | 2 326 687 A | 12/1998 |
| WO | 98/17940 | 4/1998 |
| WO | 98/59193 | 12/1998 |

* cited by examiner

INSULATED PIPE STRUCTURE AND METHODS OF MAKING SUCH STRUCTURES

This invention relates to an insulated pipe structure suitable for use in an undersea pipeline, to an insulated pipeline comprising a multiplicity of such pipe structures and to methods of forming such a pipe structure and such a pipeline.

As is well known, there is a requirement in the offshore oil and gas industry for a pipeline that can be laid on the seabed and is insulated so that the raw fluids extracted from a well can be transported through the pipeline without excessive cooling of those fluids. As a result there have been many proposals for pipe structures suitable for use in such pipelines.

Most commonly a pipe structure for use in such a pipeline comprises, intermediate its ends, an inner pipe for serving as a conduit for the fluid transported by the pipe structure, insulating material around the pipeline and an outer pipe around the insulating material. The pipe structure is formed in a discrete length, for example of the order of 12 m and a pipeline is formed by joining end-to-end a multiplicity of pipe structures. It is usually important that in the completed pipeline the nature of the joints between adjacent pipe structures is such that the insulating material is protected from ingress of seawater and from the ambient pressure at the seabed, in order to preserve its thermal insulating properties.

Finding a satisfactory pipe structure has proved difficult, especially if the pipeline may be laid in deep water. A particular challenge arises because of the desirability of being able to join one length of pipe structure to another during laying of the pipeline. This may be done on a vessel laying the pipeline and the rate at which the laying is able to be carried out may be determined by the time taken to join one pipe structure to another. At the same time, during laying of the pipeline, especially if the J-laying technique is adopted, there is likely to be a need to grip the pipe structure and apply substantial longitudinal forces to the exterior surface of the pipe structure. In order to transfer the longitudinal forces that arise during J-laying it is usual practice to weld adjacent ends of the outer pipes together, either directly or indirectly, as well as welding the inner pipes together. In that case, the longitudinal upward force applied to the uppermost outer pipe during laying can be transferred down the pipeline along the outer pipe and only transferred to the inner pipe over a multiplicity of lengths of the pipe structure. In that case the longitudinal shear force that has to be transferred between the outer pipe and the inner pipe over one length of the pipe structure is limited. A problem that arises, however, is that because of the need to weld together both the inner pipes and the outer pipes, the welding operation is a time consuming process.

WO 98/17940 describes a pipeline construction of the kind just referred to. In that case, outer pipes are securely joined together by cylindrical covers that are welded over the adjacent ends of the outer pipes. There is still a need in such a construction to provide some mechanism for the transfer of shear forces between the inner and outer pipes but because the outer pipes are joined by welding the shear forces that have to be transferred between the inner and outer pipes is much less. WO 98/17940 refers to the possibility of transferring up to three tonnes between the inner and outer pipes. That force is transferred by elastomeric bulkheads extending between the inner and outer pipes, each bulkhead being formed by an elastomeric member provided in the space between the pipes and longitudinally compressed by a suitable mechanical arrangement so as to be pressed radially against the inner and outer pipes. As already indicated, in such an arrangement welding operations have to be carried out on both the inner pipes and the outer pipes when a joint is formed. A further problem with arrangements of the kind described is that they are complicated and time consuming to install and, in order to have a chance of being effective, the additional radial stresses introduced into the inner and outer pipes as a result of the radial pressure of each bulkhead must be substantial.

Once a pipeline has been laid temperature differences between the inner pipe exposed to the relatively hot well fluids and the exterior of the pipeline exposed to the relatively cold sea are likely to lead to longitudinal shear stresses as a result of the different thermal expansions of interior and exterior parts of the pipeline. Thus even after laying, significant longitudinal shear forces between the inner and outer pipes have to be accommodated, although the forces are substantially less than the ones that occur during J-laying.

GB 2161565A describes a pipe structure that comprises, intermediate its ends, inner and outer concentric pipes with thermally insulating material therebetween. At each end of the pipe structure an annular connecting member is provided, the wall of the connecting member having a longitudinal section that is generally Y shaped with each of the upper pair of limbs of the Y being butt welded to respective ones of the inner and outer pipes and the single lower limb of the Y providing an end ring to the pipe structure. The end ring of one pipe structure can readily be butt welded to the end ring of another pipe structure thereby enabling pipe structures to be joined securely together end-to-end. The connecting member and the inner and outer pipes are typically made of steel.

The structure of GB 2161565A succeeds in providing a pipe structure that is easy to join end-to-end with another similar structure, in which the mechanical connection between the inner and outer pipes is exceptionally strong and in which the insulating material provided between the inner and outer pipes is protected from ambient pressure and from ingress of water. However, one disadvantage of such a design is that the connecting member provides a thermal bridge between the inner pipe and the outer pipe seriously affecting the extent to which the fluids travelling through the inner pipe are thermally insulated from the colder sea.

GB 2191842A describes a similar proposal with a similar disadvantage.

It is an object of the invention to provide a pipe structure which overcomes or mitigates the disadvantages referred is above.

According to the invention there is provided a pipe structure suitable for use in an undersea pipeline, the pipe structure being elongate and comprising, intermediate its ends, an inner pipe for serving as a conduit for fluid flowing through the pipe structure, thermally insulating material extending around the inner pipe and an outer shell extending around the insulating material, wherein at each of the ends of the pipe structure the inner pipe is connected to the outer shell by a thermally insulating connecting element which is secured to the inner pipe at least partly by virtue of adhesive forces between the inner pipe and the connecting element, the thermally insulating connecting element and the outer shell together protecting the insulating material from water ingress and from ambient pressure.

By using a thermally insulating connecting element which relies at least partly on adhesive forces to secure the inner pipe and the connecting element, it becomes possible in a simple way to have a pipe structure which can easily be joined end-to-end to another similar structure only by welding the inner pipe, which can protect the insulation around the inner pipe both from ambient pressure and from ingress of water, and which can accommodate substantial longitudinal loads (commonly 150 tonnes or more) applied between the inner pipe and the outer shell, for example during J-laying. At the same time, because the connecting element is thermally insulating, it does not act as a thermal bridge in the manner of GB 2161565A or GB 2191842A.

The outer shell of the insulated pipe structure is of sufficient strength and rigidity to protect the insulating material around the inner pipe from the high ambient pressure on the seabed. Thus the outer shell is preferably substantially rigid. The outer shell may be a pre-formed tubular member, for example a steel pipe. In that case the connecting element is preferably secured to the pre-formed tubular member at least partly by virtue of adhesive forces between the tubular member and the connecting element. The connecting element preferably engages an inner surface of the tubular member and preferably engages an outer surface of the pipe. Thus the connecting element may be in the form of an annular member filling the annular space between end portions of the inner pipe and the tubular member.

Reference is made above to the securing of the connecting element "at least partly by adhesive forces." In embodiments of the invention described below the connecting element is secured predominantly by adhesive forces and that is generally preferred but it should be understood that a portion of the strength of the connection may be derived from other effects. For example, the effect of water pressure may be to generate radial forces between the connecting element and the inner pipe and between the tubular member and the connecting element, and those forces may give rise to significant friction forces which can support the adhesive forces in resisting any longitudinal movement of the inner pipe relative to the outer shell. In order to promote good adhesion the surface of the inner pipe and/or the surface of the tubular member to which the connecting element is secured may be surface-treated and, indeed, some radially extending projections/recesses may be provided on those surfaces to improve further the securing of the connecting element. Also it is possible to arrange for example, for the connecting element to expand in situ as a result of a chemical change in order to introduce radial forces and therefore friction forces strengthening the connection.

Preferably the connecting element is formed in situ. The element may for example be composed entirely of material that is generally regarded as an adhesive.

Instead of providing a pre-formed tubular member for the outer shell and a separate connecting element, the connecting element may be formed as an integral part of the outer shell and the connecting element and the outer shell may be formed in situ. An example of an arrangement of this kind and the manner in which it can be made is described below with reference to the drawings.

Preferably, the inner pipe projects in an axial direction from opposite ends of the pipe structure. That facilitates connection of one pipe structure to another because access to the junction of the inner pipes is easily obtained.

The connecting element may be formed from various materials that are known per se. Especially in the case where the outer shell is a pre-formed tubular member and the connecting element fills an annular space between end portions of the inner pipe and the tubular member, the connecting element may be an unexpanded material, for example a synthetic polymeric material such as polyurethane or some other resin material. In an example of the invention described below the material comprises a polyol isocyanate. Especially in the case where the outer shell is integrally formed with the connecting element and the case where the connecting element extends over the outer shell, the connecting element may be formed from a composite material that may for example comprise a filler material such as glass fibre, carbon fibre or Kevlar (registered trade mark) in a polymeric resin material which may be an unexpanded material and may for example be polyurethane.

The axial length of connection between the connecting element and the inner pipe and, if there is one, the connection between the connecting element and the outer shell can be chosen so as to enable sufficient shear forces to be transferred through the connection.

It will be noted that both the material placed between the inner pipe and the outer shell intermediate its ends and the material of the connecting element are described as thermally insulating materials. It should be understood, however, that the material of the connecting element does not need to have such good insulating properties as the material placed between the inner pipe and the outer shell intermediate its ends, because the cross-sectional area of the thermal path through the connecting element is so much smaller over a full length of the pipe structure. Thus, the thermal conductivity of the material forming the thermally insulating connecting element is preferably less than $1.00 \text{ W/}^\circ \text{ Km}$ and more preferably less than $0.2 \text{ W/}^\circ \text{ Km}$. The insulating material placed between the inner pipe and the outer shell preferably has a thermal conductivity less than not only $1.00 \text{ W/}^\circ \text{ Km}$, but also less than $0.2 \text{W/}^\circ \text{ Km}$ and indeed preferably substantially less than those values; for example, the thermal conductivity of the insulating material is preferably less than $0.1 \text{ W/}^\circ \text{ Km}$. In order that the insulating material between the outer shell and the inner pipe is as effective as possible it preferably occupies over 90 percent, preferably substantially all, of the space between the shell and the pipe and bounded at its ends by the connecting elements. In the event that not all the space is occupied by thermally insulating material or not all by the same thermally insulating material, the thermal insulation provided between the inner pipe and the outer pipe is preferably more effective than that of a material filling the space and having a thermal conductivity of $0.1 \text{ W/}^\circ \text{ Km}$.

As has already been described, during laying of a pipeline high demands are placed on the pipe structure to withstand longitudinal shear forces between the inner pipe and the outer shell. Preferably the strength of the connection between the outer shell and the inner pipe is such that it can withstand a longitudinal shear force of more than 75 tonnes. In that case a total longitudinal force of more than 150 tonnes can be transferred from the outer pipe to the inner pipe by a single pipe structure, as may be required when J-laying, especially in deep water. There may of course be some contribution to the overall longitudinal shear force between the inner pipe and the outer shell that the structure can withstand from other parts of the structure such as the insulating material placed between the inner pipe and the outer shell intermediate the ends of the pipe structure, but that is unlikely to contribute significantly in the case of most insulating materials.

The pipe structure may comprise a single pipe length comprising a single inner pipe and a single outer shell but generally it will be preferred that the pipe structure comprises a plurality of pipe lengths, each length comprising an inner pipe, insulating material and an outer shell, the pipe lengths being connected end-to-end. Whilst it is possible for thermally insulating connecting elements to be provided at the joints of the pipe lengths intermediate the ends of the pipe structure, it will usually be preferred for those joints to be of another design which may be well known per se; those intermediate joints can be made on shore and the procedure required to form them need not have any effect on the subsequent pipe laying procedure.

The present invention also provides an insulated pipeline comprising a multiplicity of insulated pipe structures as defined above, the pipe structures being joined end-to-end.

The pipe structures are most advantageously structurally connected to one another at least principally by virtue of the connections of the ends of the inner pipes of the pipe structures. It will be appreciated that the insulated pipeline formed from the pipe structures is distinctive because not only is there not a continuous metal outer pipe consisting of lengths of outer pipe connected together by welding (as there is in for example WO 98/17940) but nor is there a continuous outer metal structure (as there is in for example GB 2161565A where lengths of steel outer pipe are joined together by joints which connect them to the inner pipe). Rather in the present insulated pipeline, the outer pipe may be formed of lengths of metal pipe interrupted at joints of adjacent pipe structures by connecting elements of thermally insulating material or the outer pipe may be formed entirely of thermally insulating material. The ends of the inner pipes of adjacent pipe structures are preferably welded together. At the connection of one pipe structure to another, a thermally insulating arrangement is preferably provided around the adjacent inner pipe ends between the adjacent connecting elements. As will be understood, that arrangement need not have any load bearing capability. Whilst it is of course desirable for the insulating material of that thermally insulating arrangement to be protected from water ingress and from ambient water pressure by the arrangement, it will be appreciated that because of the limited longitudinal extent of the arrangement such matters are not so critical.

The present invention also provides a method of forming an insulated pipe structure as defined above. The outer shell may comprise a pre-formed tubular member and the connecting element may be formed in situ; alternatively the outer shell and the connecting element may be formed in situ during the same operation and may be integral with one another.

The present invention further provides a method of forming an insulated pipeline by joining together end-to-end a multiplicity of pipe structures, the pipe structures being as defined above. The method is preferably carried out during laying of the pipeline; thus, the method preferably includes the steps of laying the pipeline undersea from a pipe-laying vessel and joining the pipe structures successively to an end of the pipeline as the pipeline is laid. The method is especially suitable in the case where the pipeline is laid using a J-lay technique because of the magnitude of the longitudinal shear forces that may be applied during J-laying.

By way of example certain embodiments of the invention will now be described with reference to the accompanying drawings, in which.

Figure 1:
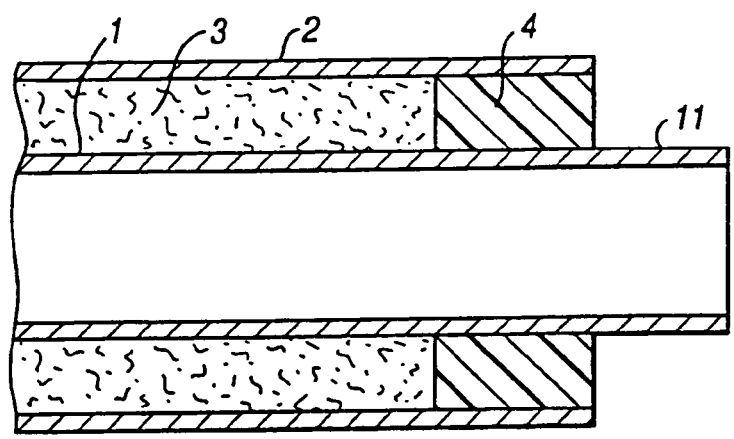
FIG. 1 is a sectional side view of an end of a pipe structure embodying the invention.

Referring first to FIG. 1, the pipe structure shown generally comprises an inner pipe 1, an outer pipe 2 and thermally insulating material 3. The right hand end (right hand as seen in FIG. 1) is provided with a connecting element 4 which is of annular shape and extends it between the inside of the outer pipe 2 and the outside of the inner pipe 1. As can be seen in FIG. 1, the outer pipe 2 ends in substantially the same position along the longitudinal axis of the structure as the element 4, but the inner pipe 1 passes through the element 4 and projects a short distance beyond the element 4, the projecting part being indicated by reference numeral 11.

The inner and outer pipes 1 and 2 are of materials and dimensions that are known per se. For example the inner and outer pipes may be formed of steel while the thermally insulating material 3 may be any of the thermally insulating materials conventionally used in such structures. A range of such materials is described in WO 98/59193. The external diameter of the inner pipe 1 in one particular example is about 220 mm (8 inch pipe) and the external diameter of the outer pipe 2 in that example is about 324 mm (12 inch pipe).

The connecting element 4 is made of a thermally insulating material which provides much more of a thermal barrier than, say, a thermally conducting material such as steel, but need not be as good a thermal insulator as the thermally insulating material 3 because of the more limited longitudinal extent of the element 4. The connecting element 4 is also required to have substantial adhesive properties so as to provide a sufficiently strong bond with both the inner pipe 1 and the outer pipe 2 to resist the longitudinal shear forces that may be applied to those bonds during use. In order to promote good bonding of the element 4 to the pipes 1 and 2 the areas of the pipe surface to which the element 4 is required to bond may be pre-treated, for example by sand-blasting, to create a roughened surface finish.

In the example being described, the connecting element 4 is formed in situ and is a polyol isocyanate having a thermal conductivity of about 0.16 W/° Km. If desired, an annular shutter (not shown) may be placed between the inner and outer pipes immediately to the outside of the insulation 3 and employed to limit the axially inward penetration of the material being formed into the element 4.

Figure 2:
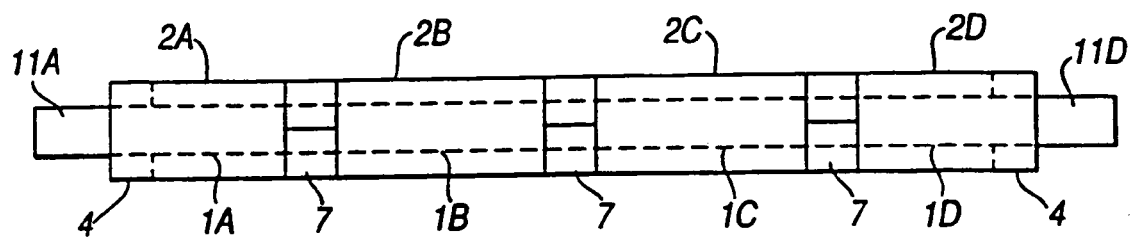
FIG. 2 is a side view of a pipe structure made up of four sections joined together end-to end, the ends of the pipe structure being of the form shown in FIG. 1.

Although it is possible for the pipe structure, whose end is shown in FIG. 1, to be made up of a single length of inner pipe and a single length of outer pipe joined at their other ends in the same way as is illustrated in FIG. 1, that is not usually the preferred construction. FIG. 2 illustrates schematically the preferred approach in which the pipe structure is made up of a plurality of lengths of inner and outer pipes (in this particular example four lengths of each pipe). The pipe structure shown in FIG. 2 would usually be manufactured as the unit shown on dry land and thereafter transferred to a pipe-laying vessel or the like whose successive pipe structures would be joined end-to-end to form a pipeline laid from the vessel.

In FIG. 2 the four lengths of inner pipe are referenced 1A, 1B, 1C and 1D, whilst the four lengths of outer pipe are referenced 2A, 2B, 2C and 2D. It will be understood that each of the ends of the pipe structure shown in FIG. 2 are of the form shown in FIG. 1 so that the structure is provided with inner pipe projecting parts 11A and 11D at its opposite ends. The length of the projecting ends are exaggerated in the interests of clarity in FIG. 2.

The intermediate joints between the adjacent ends of four lengths of the inner and outer pipes may be formed in the same way as described in respect of FIG. 1, but that may not be necessary, especially if the assembly of individual pipe lengths into the structure shown in FIG. 2 can take place prior to pipe-laying and therefore outside the critical path. A simple and satisfactory intermediate joint may be made by arranging for the outer pipe lengths each to be shorter than the lengths of inner pipe. Adjacent lengths of inner pipe can then be butt welded together with an axial gap formed around the inner pipe ends. That annular gap can be closed in a watertight and pressure resistant manner by welding two semi-circular rings 7 to the outer pipe and to each other after placing any further insulating material that may be desirable around the inner pipe ends. Although the operation of joining the inner and outer pipe lengths using the rings 7 involves a series of welding steps and is therefore time consuming, the extra time required does not represent a particular disadvantage if the welding steps are carried out in advance of the laying operation and do not therefore delay the laying of the pipe.

Of course the number of pipe lengths joined end-to-end to form the pipe structure shown in FIG. 2 may be varied as may the length of each pipe length. In a particular example of the invention the pipe structure is formed from four lengths of inner and outer pipes and has an overall length of 48 m.

Typically, the pipe structure is laid by a vessel employing a S-lay or J-lay technique. First the pipe structure as shown in FIG. 2 is brought into end-to-end coaxial relationship with the end of the pipeline being laid, that end being of the form shown in FIGS. 1 and 2 (as a result of previous pipe structures having been laid). The end 11 of the inner pipe 1 of the pipe structure to be laid is then butt welded to the end of the inner pipe of the pipeline. Insulation can then be placed around the butt welded ends of the inner pipe and covered with a shield in any appropriate manner. It should be noted that, in the case of the insulation around the inner pipe joint just referred to, it is not so important to protect the insulation from the ingress of water and/or ambient pressure because of the limited longitudinal extent of the junction. The joining of the pipe structure to the end of the pipeline can therefore be accomplished in a relatively simple and rapid manner.

Especially in the case where the pipeline is laid by J-laying a substantial upward longitudinal force will be applied to the exterior of the pipe structure just after it has been attached to the pipeline. That force is transmitted via the connecting elements 4 of the pipe structure to the inner pipe and thus to the pipeline as a whole extending downwardly from the vessel.

After laying there may still be substantial longitudinal shear forces between the inner and outer pipes 1, 2 arising from their temperature differences and the thermal expansion properties of the two pipes. Those shear forces are likely to be lower than the forces experienced during J-laying but may still be substantial. Since the greatest shear forces are experienced during laying it may not be serious if the adhesive forces between the connecting elements 4 and the inner and/or outer pipes 1, 2 deteriorate to some extent over time.

Figure 3:
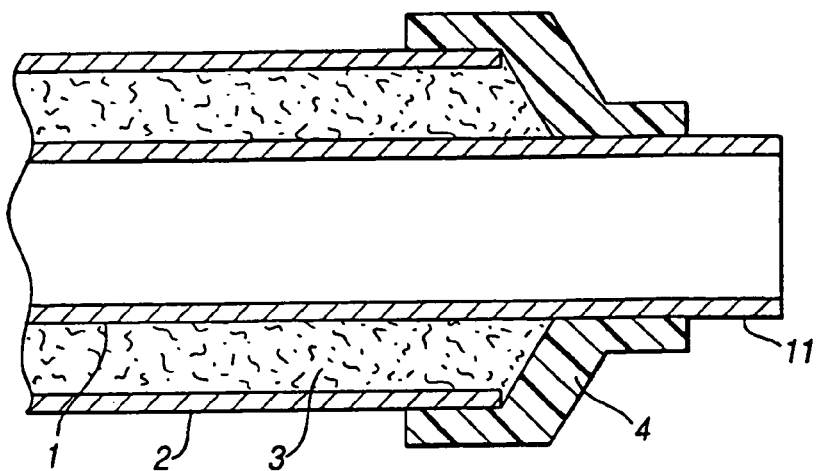
FIG. 3 is a sectional side view of an end of another pipe structure embodying the invention.

FIG. 3 shows a pipe structure of generally similar form to the structure as shown in FIG. 1. In this description corresponding parts are designated by the same reference numerals and only features of the structure of FIG. 3 that differ from the structure of FIG. 1 are described below. In the arrangement shown in FIG. 3, the connecting element 4 is bonded to the outside of the outer pipe 2 instead of the inside; the connecting element is again formed in situ and can be formed by mounting the assembly of the inner pipe 1, outer pipe 2 and insulating material 3 on a mandrel or some other appropriate rotatable mounting, and winding a filament loaded with suitable adhesive around the end of the assembly to form an end to the pipe structure of the form shown in FIG. 3.

Figure 4:
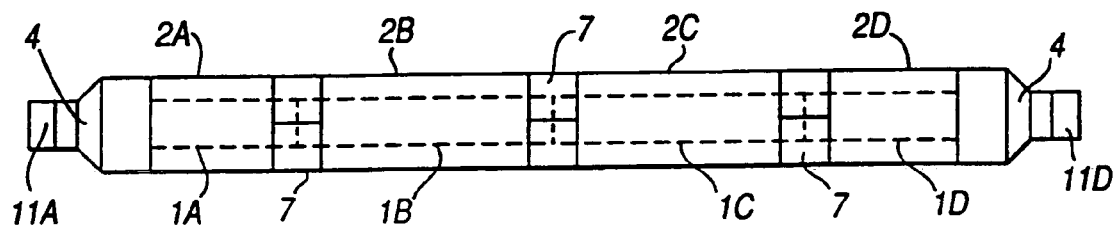
FIG. 4 is a side view of a pipe structure made up of four sections joined together end-to-end, the ends of the pipe structure being of the form shown in FIG. 3.

FIG. 4 is a view similar to FIG. 2 and showing a pipe structure of the form described above with reference to FIG. 2, but incorporating the end arrangement shown in FIG. 3 rather than FIG. 1. Corresponding parts are designated by the same reference numerals in FIGS. 2 and 4.

It will be understood that the pipe structure illustrated in FIGS. 3 and 4 is used in substantially the same way as already described for the pipe structure of FIGS. 1 and 2.

Figure 5:
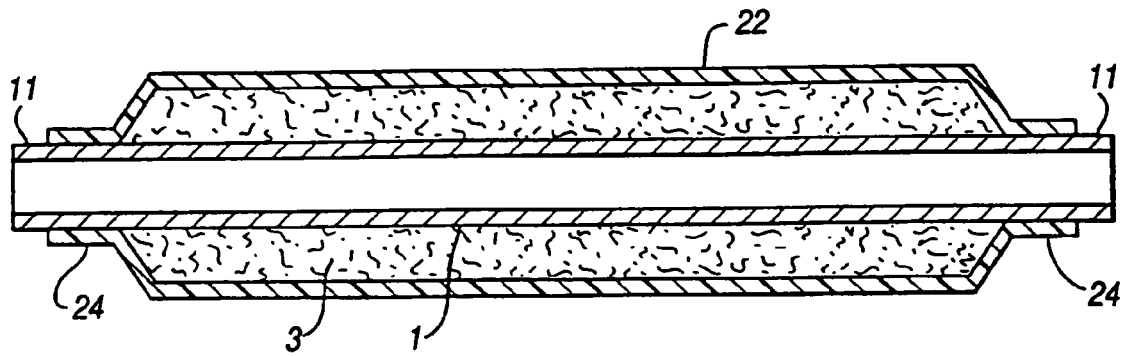
FIG. 5 is a sectional view of a modified form of pipe structure.

FIG. 5 shows a pipe structure that is a modified form of the structure shown in FIGS. 3 and 4. Instead of forming only the connecting element by winding a filament loaded with suitable adhesive, the whole of the outer shell, indicated by reference numeral 22 in FIG. 5, and the connecting elements at each end of the structure, indicated by reference numeral 24 in FIG. 5, are formed integrally with one another during such a filament winding process. Thus, rather than having inner and outer steel pipes, the structure comprises an inner pipe, which may be steel, and an outer shell which is formed of a synthetic polymeric material. The outer shell must of course be sufficiently thick to withstand the ambient pressures to which the structure is to be subjected on the seabed. It will be appreciated that in the case of the structure of FIG. 5 it may be appropriate to have all junctions between pipe lengths of the same kind and it may be advantageous to form the structure of FIG. 5 at a substantial unit length (for example 48 m), and to form all the joints during laying of the pipeline.

As has been indicated above it is important for joints between the connecting element and the inner pipe and also, if there are any, joints between the connecting element and the outer pipe to be as watertight as possible. If desired, the watertightness of such joints, especially the watertightness over an extended period of time, may be enhanced by incorporating one or more 'O' ring seal arrangements into the joints.

What is claimed is:

1. An insulated pipe structure suitable for use in an undersea pipeline, the pipe structure being elongate and comprising, intermediate its ends, an inner pipe for serving as a conduit for fluid flowing through the pipe structure, thermally insulating material extending around the inner pipe and a substantially rigid outer shell extending around the insulating material, wherein at each of the ends of the pipe structure the inner pipe is connected to the outer shell by a thermally insulating connecting element which is secured to the inner pipe at least partly by virtue of adhesive forces between the inner pipe and the connecting element, the thermally insulating connecting element is a unitary one piece element, and the thermally insulating connecting element and the outer shell together protecting the insulating material from water ingress and from ambient pressure.

2. An insulated pipe structure according to claim 1, in which the outer shell comprises a pre-formed tubular member.

3. An insulated pipe structure according to claim 2, in which the connecting element is secured to the pre-formed tubular member at least partly by virtue of adhesive forces between the tubular member and the connecting element.

4. An insulated pipe structure according to claim 2, in which the connecting element engages an inner surface of the tubular member.

5. An insulated pipe structure according to claim 2, in which the connecting element engages an outer surface of the tubular member.

6. An insulated pipe structure according to claim 1, in which the connecting element is formed in situ.

7. An insulated pipe structure according to claim 1, in which the inner pipe projects in an axial direction from opposite ends of the pipe structure.

8. An insulated pipe structure according to claim 1, in which the connecting element comprises a synthetic polymeric material.

9. An insulated pipe structure according to claim 8, in which the synthetic polymeric material is a thermosetting resin.

10. An insulated pipe structure according to claim 1, in which the thermal conductivity of the material forming the thermally insulating connecting element is less than 1.0 W/Km.

11. An insulated pipe structure according to claim 1, in which the thermally insulating material extending around the inner pipe occupies substantially all the space between the outer shell and the inner pipe and bounded at its ends by the connecting elements.

12. An insulated pipe structure according to claim 1, in which the structure comprises a plurality of pipe lengths, each length comprising an inner pipe, insulating material and an outer shell, the pipe lengths being connected together end-to-end.

13. An insulated pipeline comprising a multiplicity of insulated pipe structures, according to claim 1, the pipe structures being joined end-to-end.

14. An insulated pipeline according to claim 13, wherein, at the connection of one pipe structure to another, a thermally insulating arrangement is provided around the adjacent inner pipe ends between the adjacent connecting elements.

15. An insulated pipeline according to claim 13, in which the pipe structures are structurally connected to one another at least principally by virtue of the connections of the ends of the inner pipes of the pipe structures.

16. An insulated pipeline according to claim 15, in which the ends of the inner pipes of adjacent pipe structures are welded together.

17. A method of forming an insulated pipe structure according to claim 1.

18. A method according to claim 17, in which the outer shell comprises a pre-formed tubular member and the connecting element is formed in situ.

19. A method according to claim 17, in which the outer shell and the connecting element are formed in situ during the same operation and are integral with one another.

20. A method of forming an insulated pipeline by joining together end-to-end a multiplicity of pipe structures, the pipe structures being according to claim 1.

21. An insulated pipe structure according to claim 1, wherein the outer shell is made of metal.

22. An insulated pipe structure according to claim 1, wherein the outer shell is made of steel.

23. An insulated pipe structure suitable for use in an undersea pipeline, the pipe structure being elongate and comprising, intermediate its ends, an inner pipe for serving as a conduit for fluid flowing through the pipe structure, thermally insulating material extending around the inner pipe and a substantially rigid outer shell extending around the insulating material, wherein at each of the ends of the pipe structure the inner pipe is connected to the outer shell by a thermally insulating connecting element which is secured to the inner pipe at least partly by virtue of adhesive forces between the inner pipe and the connecting element, the thermally insulating connecting element and the outer shell together protecting the insulating material from water ingress and from ambient pressure, wherein the connecting element is formed as an integral part of the outer shell.

24. An insulated pipe structure according to claim 23, in which the connecting element and the outer shell are formed in situ.

25. An insulated pipe structure suitable for use in an undersea pipeline, the pipe structure being elongate and comprising, intermediate its ends, an inner pipe for serving as a conduit for fluid flowing through the pipe structure, thermally insulating material extending around the inner pipe and a substantially rigid outer shell extending around the insulating material, wherein at each of the ends of the pipe structure the inner pipe is connected to the outer shell by a thermally insulating connecting element which is secured to the inner pipe at least partly by virtue of adhesive forces between the inner pipe and the connecting element, the thermally insulating connecting element and the outer shell together protecting the insulating material from water ingress and from ambient pressure, wherein the strength of the connection between the outer shell and the inner pipe is such that it can withstand a longitudinal shear force of 75 tonnes.

26. An insulated pipe structure according to claim 25, wherein an outer surface of the inner pipe is surface-treated.

27. A method of forming an insulated pipe structure suitable for use in an undersea pipeline, the pipe structure being elongate and comprising, intermediate its ends, an inner pipe for serving as a conduit for fluid flowing through the pipe structure, thermally insulating material extending around the inner pipe and a substantially rigid outer shell extending around the insulating material, wherein the method includes:

connecting the inner pipe to the outer shell at each of the ends of the pipe structure by a thermally insulating connecting element, wherein the thermally insulating connecting element is a unitary one piece element; and securing the thermally insulating connecting element to the inner pipe at least partly by adhesive forces between the inner pipe and the connecting element;

the thermally insulating connecting element and the outer shell together protecting the insulating material from water ingress and from ambient pressure.

28. An insulated pipe structure suitable for use in an undersea pipeline, the pipe structure being elongate and comprising, intermediate its ends, an inner pipe for serving as a conduit for fluid flowing through the pipe structure, thermally insulating material extending around the inner pipe and an outer shell extending around the insulating material, wherein at each of the ends of the pipe structure the inner pipe is connected to the outer shell by a unitary one-piece thermally insulating connecting element which is secured to the inner pipe at least partly by virtue of adhesive forces between the inner pipe and the connecting element, the connecting element engaging with an outer surface of the outer shell, the thermally insulating connecting element and the outer shell together protecting the insulating material from water ingress and from ambient pressure.

29. An insulated pipe structure suitable for use in an undersea pipeline, the pipe structuring being elongate and comprising, intermediate its ends, an inner pipe for serving as a conduit for fluid flowing through the pipe structure, thermally insulating material extending around the inner pipe and a substantially rigid outer shell, taking the form of a pre-formed tubular member, extending around the insulating material, wherein at each of the ends of the pipe structure the inner pipe is connected to the outer shell by a unitary one-piece thermally insulating connecting element, the thermally insulating connecting element being arranged to engage with an outer surface of the outer shell, the thermally insulating connecting element being secured to the outer shell predominantly by virtue of adhesive forces between the outer shell and the connecting element, the thermally insulating connecting element and the outer shell together protecting the insulating material from water ingress and from ambient pressure.

30. An insulated pipe structure suitable for use in an undersea pipeline, the pipe structure being elongate and comprising, intermediate its ends, an inner pipe for serving as a conduit for fluid flowing through the pipe structure, thermally insulating material extending around the inner pipe and a substantially rigid outer shell extending around the insulating material, wherein at each of the ends of the pipe structure the inner pipe is connected to the outer shell by a unitary one-piece thermally insulating connecting element which is secured to the inner pipe at least partly by virtue of adhesive forces between the inner pipe and the connecting element, the outer shell being integrally formed with the connecting element, the thermally insulating connecting element and the outer shell together protecting the insulating material from water ingress and from ambient pressure.

31. A method of forming an insulated pipe structure suitable for use in an undersea pipeline, the pipe structure being elongate and comprising, intermediate its ends, an inner pipe for serving as a conduit for fluid flowing through the pipe structure, thermally insulating material extending around the inner pipe and a substantially rigid outer shell extending around the insulating material, the method comprising:
connecting the inner pipe at each of the ends of the pipe structure to the outer shell by a thermally insulating connecting element, formed in situ, which is secured to the inner pipe at least partly by virtue of adhesive forces between the inner pipe and the connecting element, and engages with an inner surface of the outer shell, the thermally insulating connecting element and the outer shell together protecting the insulating material from water ingress and from ambient pressure, the strength of the connection between the outer shell and the inner pipe is such that it can withstand a longitudinal shear force between the inner pipe and the outer shell of 75 tonnes.

32. A method of forming an insulated undersea pipeline comprising a multiplicity of insulated pipe structures connected together in end to end coaxial relationship, each pipe structure being elongate and comprising, intermediate its ends, an inner pipe for serving as a conduit for fluid flowing through the pipe structure, thermally insulating material extending around the inner pipe and a substantially rigid outer shell extending around the insulating material, the method comprising:
forming each pipe structure by connecting the inner pipe at each of its ends to the outer shell by a thermally insulating connecting element which is secured to the inner pipe at least partly by virtue of adhesive forces between the inner pipe and the connecting element, the thermally insulating connecting element and the outer shell together protecting the insulating material from water ingress and from ambient pressure,
putting the pipe structures on a pipe laying vessel,
forming the pipeline on the vessel by connecting the inner pipes of the pipe structures to each other end to end, and
laying the pipeline into the sea from the vessel.

33. A method according to claim 32, wherein some of the end to end connections of the pipe structures are made in advance of the laying of the pipeline and some of the end to end connections are made to the end of the pipeline as the pipeline is laid from the vessel.

34. A method according to claim 32, wherein a pipe structure is made of a plurality of lengths of inner and outer pipes, wherein the pipe structure has at least one intermediate joint.

35. A method according to claim 34, wherein the at least one intermediate joint is formed without the thermally insulating connecting element.

* * * * *